May 7, 1968 W. J. GILMORE 3,381,363
METHOD OF MAKING PUSH-PULL CABLE WITH PLASTIC LINED CASING
Original Filed Aug. 9, 1962 2 Sheets-Sheet 1
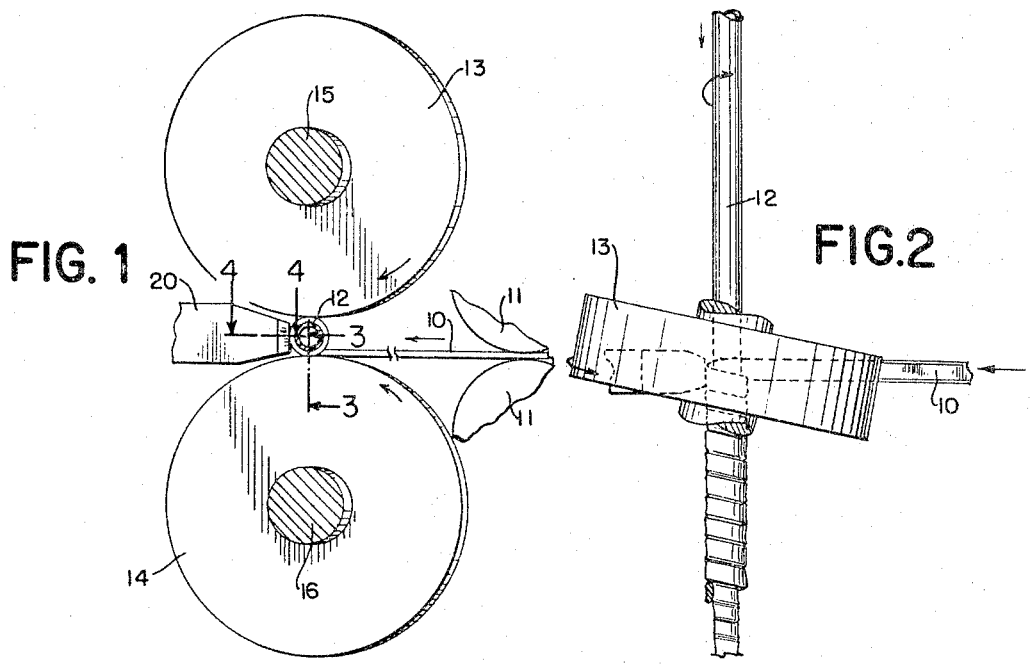
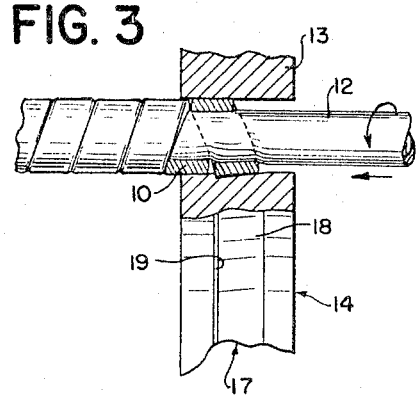
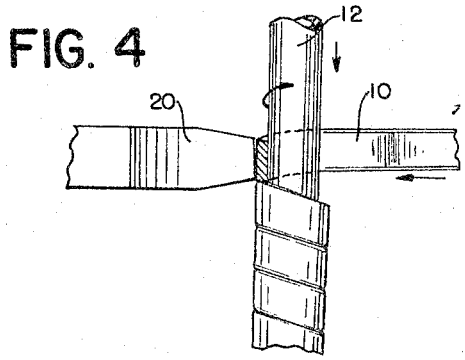
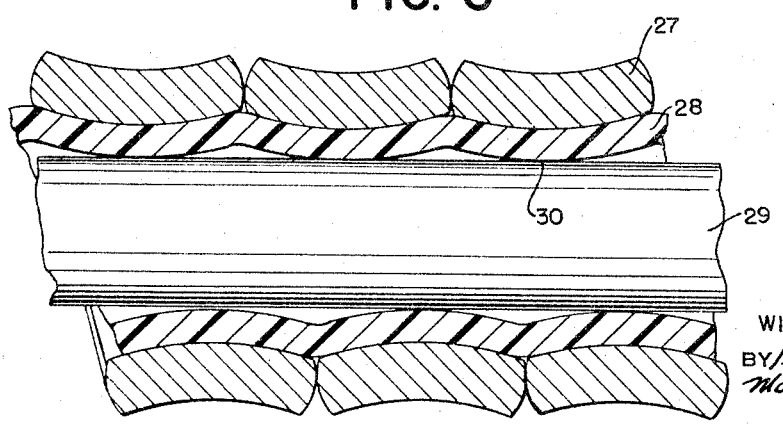
INVENTOR
WILLIAM J. GILMORE
BY *Pennie Edmonds*
*Morton Taylor & Adams*
ATTORNEYS INVENTOR
WILLIAM J. GILMORE
BY Pennie Edmonds
Morton Taylor and Adams
ATTORNEYS

United States Patent Office 3,381,363
Patented May 7, 1968

3,381,363
METHOD OF MAKING PUSH-PULL CABLE WITH PLASTIC LINED CASING
William J. Gilmore, Manitou Beach, Mich., assignor to American Chain & Cable Company, Inc., New York, N.Y., a corporation of New York
Original application Aug. 9, 1962, Ser. No. 215,916, now Patent No. 3,214,995, dated Nov. 2, 1965. Divided and this application June 4, 1965, Ser. No. 470,956
5 Claims. (Cl. 29—434)

ABSTRACT OF THE DISCLOSURE

A method is described for making a push-pull cable casing by axially translating and rotating a length of plastic tubing with respect to a length of wire, and axially translating the length of wire substantially perpendicularly toward said tubing. The wire is helically wrapped in a succession of adjoining turns about the tubing, and is wound sufficiently tightly to deform the bore of the tubing inwardly along a helical path. Preferably the wire is flat, and is plastically deformed as it is wrapped in place, deformation of the tubing being accomplished by the act of deforming the flat wire in contact with it. A core member of circular cross-section is inserted into the tubing to form the push-pull cable. The diameter of the core member is substantially equal to the minimum diameter of the helically deformed portion of the plastic tubing, and makes contact with the plastic tubing only where such tubing has been deformed inwardly. A lubricant is introduced into the interior of the plastic tubing where the core element is spaced by the helical deformation from the remainder of the inner surface of the plastic tubing.

---

This application is a division of my copending application Ser. No. 215,916, filed Aug. 9, 1962, now Patent No. 3,214,995, granted Nov. 2, 1965.

This invention relates to a method of making push-pull cables having a casing sheathed with helically wrapped wire and lined with plastic tubing. More particularly, it relates to a method of making a push-pull cable of that type wherein the plastic liner is deformed inwardly at portions thereof throughout its length.

Plastic-lined wire-sheathed casings are widely used in push-pull cables as an alternative to the more costly ball-bearing cable assemblies. In a plastic lined assembly, the slidable core element is capable of being in bearing contact with the entire bore of the liner and while it is less expensive than the ball-bearing type it is subject to considerably more static and dynamic friction during operation. Even though an effort is made to lubricate its core-to-liner bearing surface properly, the friction in such a push-pull cable requires that far greater force must be applied at the operator's end of the assembly than is ideally necessary to exert a given load at its working end.

It is the primary purpose of the present invention to provide an improved method of making wire-sheathed plastic-lined push-pull cable assembly which is as low in cost as those presently available but which is appreciably more efficient in operation, particularly insofar as friction on the slidable core element is concerned.

Broadly stated, the new push-pull cable casing comprises an outer self-supporting sheath of wire wrapped helically with successive turns adjoining and an inner tubular plastic liner having a nominally uniform bore which is deformed inwardly at portions thereof throughout its length. Preferably, the sheath wire is flat and the liner bore is nominally of uniform circular lateral cross section. More particularly, the plastic liner is compressively wrapped about directly by the sheath wire and it is deformed inwardly by the sheath wire in a helical zone throughout the length of the liner corresponding to the helix of the sheath wire.

When this casing is in combination with a flexible core element in a push-pull cable assembly, the core element engages the liner bore only at the inwardly deformed portions thereof and defines voids with the remainder of the bore adapted to contain a lubricant. As a result, the casing liner cannot be in full surface-to-surface bearing contact with the core element throughout the length of the assembly, but rather contacts the core element only along its inwardly extending lands which constitute but a portion of the liner bore. Between these points of bearing contact, the bore surface is spaced from the core element and will hold substantial deposits of lubricant with which the core element is coated during assembly. It has been well established by comparative tests that this purposeful deformation of the liner in the new assembly resulting in interrupted bearing contact between the liner and the core element effects a considerable and surprising reduction in the amount of static and dynamic friction created during operation.

The invention also provides a novel method of making this new casing. It broadly comprises the steps of axially translating and rotating a length of plastic tubing with respect to a length of wire, axially translating the length of wire toward the tubing substantially perpendicularly with respect to the tubing axis, and helically wrapping the wire in a succession of adjoining turns about the tubing sufficiently tightly to deform the bore of the tubing inwardly at portions thereof throughout is length. Thus, an essential feature of the new method is that the sheath wire is helically wrapped in a manner whereby it forms in situ the required interrupted bearing surface on the liner's bore. One particular technique for effecting this non-uniform deformation of the liner bore involves translating a flat wire toward the tubing with the plane of the wire skewed at an acute angle with respect to the tubing axis so that a corner edge of the wire indents the tubing to form an inwardly extending helical land on the tubing bore.

Preferred embodiments of the invention are described hereinbelow with reference to the accompanying drawings, wherein FIG. 1 is a fragmentary sectional elevation of apparatus for making the new casing in accordance with the method of the invention;

FIG. 2 is a fragmentary plan view of the apparatus of FIG. 1;

FIG. 3 is an enlarged fragmentary section taken along the line 3—3 of FIG. 1;

FIG. 4 is an enlarged fragmentary section taken along the line 4—4 of FIG. 1; and FIGS. 5–8 are enlarged fragmentary sections of respective forms of the new push-pull cable assembly.

Figure 5:
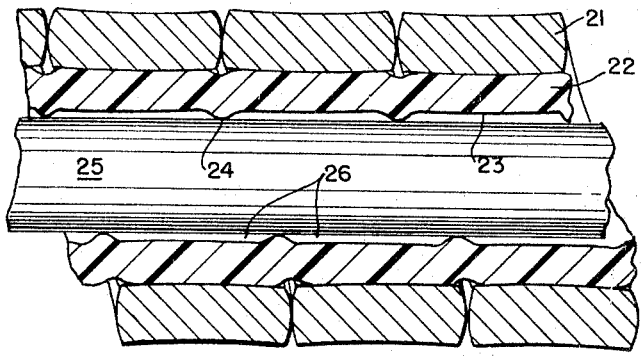

Referring first to FIGS. 1–4, there is shown a particularly advantageous form of apparatus for practicing the method of this invention. A steel wire 10, shown here for purposes of example as one with a substantially rectangular cross section, is advanced forcibly along its axis by drive rolls indicated at 11. A plurality of such rolls may be aligned to effect the desired feed rate of the wire and they may in turn be driven by a suitable variable-speed drive.

Moving transverse to the wire 10 is an indefinite length of extruded seamless plastic tubing 12 which may be of a nylon, high density polyethylene, polytetrafluoroethylene, or so on and of moderate wall thickness chosen for strength and flexibility. For many uses, nylon may be preferred. Suitable spinner means should be provided for translating the tubing 12 along its axis and at the same time rotating it at a rate such that the tangential velocity of its outside surface approximates the rate of advance of the wire 10 as closely as possible. It is helpful in practicing the method of the invention to provide means for varying both the rate of translation and of rotation of the plastic tubing 12.

As shown in FIGS. 1 and 2, the tubing 12 enters between a pair of opposed forming rolls 13 and 14 arranged one above the other about respective shafts 15 and 16 which are skewed with respect to the line of travel of the tubing 12 at an angle substantially equal to the helix angle of the wire sheath to be formed. The forming rolls 13 and 14 are driven, again advantageously by variable speed means, in opposite directions but at an equal rate. The width of the rolls 13 and 14 is substantially greater than the width of the flat wire 10 and the working circumference of the upper roll 13 is uniformly smooth whereas that of the lower roll 14 is formed with a groove 17, as shown in FIG. 3. The groove 17 has the cross sectional shape of a distorted V in that is comprises one long sloping side 18 cut at an acute angle of only about five degrees from the nominal cylindrical circumference of the roll 14. The remainder of the groove 17 is defined by a very short steeply sloping side 19 which together with the side 18 forms an included right angle. For most sizes of the flat wire 10, a typical overall width of the groove 17 may be .190 inch and the overall width of both rolls 13 and 14 may be typically about three-quarters of an inch.

Directed toward the gap between the rolls 13 and 14 is a pad 20 formed with a nose of hard wear-resistant metal which terminates at a plane perpendicular to the axis of advance of the wire 10 and spaced from the common vertical center line of the opposed rolls 13 and 14 a distance slightly greater than the radius desired in the casing to be fabricated. Thus, as the casing is formed in the manner described below, it engages the nose of the pad 20 and is offset the common vertical center line of the opposed rolls 13 and 14 away from the advancing flat wire 10. As shown in FIG. 1, this offset is to the left of the aforementioned vertical center line and may be typically about one-sixteenth of an inch.

In the general mode of operation, the flat wire 10 is translated forcibly along its axis by the feed rolls 11 to engage the uppermost portion of the lower forming roll 14 substantially tangentially in the groove 17 thereof. The forming roll 14 then directs the wire 10 beneath the plastic tubing 12 as shown in FIG. 1. As the wire 10 moves with the surface of the rotating tubing 12, it is brought around a quarter of a turn into slidable engagement with the nose of the pad 20. It is then helically wrapped further around the tubing 12 into engagement with the lowermost portion of the upper forming roll 13, and then completes a full helical turn. Additional successive turns are formed in this same general manner so that there emerges from the forming rolls a complete casing lined with the plastic tubing 12 and sheathed with the flat wire 10 wrapped helically thereabout with successive turns adjoining one another side-by-side.

An important feature of this method is that the plastic tubing 12 is to be deformed in situ as the wire is wrapped thereabout, and this is accomplished for example as follows: Since the flat wire 10 rests in the tilted groove 17 as the wire sheath is wound, one corner edge thereof is raised with respect to the other at the time the wire 10 first engages the underside of the plastic tubing 12. This is shown more clearly in FIG. 3, where for clarity the skewed orientation of the rolls 13 and 14 is not illustrated. Consequently, that elevated corner edge indents itself into the wall of the tubing 12 to exceed the yield strength thereof and create a land on the tubing bore. This indenting effect continues during that initial quarter-wrap of the wire 10 about the tubing 12 until a given point on the wire reaches the nose of the pad 20. When the wire engages the flat nose of the pad, which is parallel to the tubing axis, the general plane of the wire is brought back into a parallel orientation with respect to the tubing. This stage of the process is best shown in FIG. 4. However, the indentation previously formed by the corner edge of the wire remains in the tubing 12 after the wire is brought back into its parallel orientation. Since the working surface of the upper forming roll 13 is smoothly cylindrical, it ensures that the wire 10 remains in this parallel orientation as each successive turn is produced therefrom. Substantial compressive force is exerted on the plastic tubing 12 during this helical wrapping operation so that the outside and inside diameters of the tubing are somewhat reduced. Since no mandrel supports the tubing 12, it has some freedom of movement and may emerge from the forming rolls 13 and 14 at a slight angle after the sheath wire has been wrapped about it.

The product of the afore-mentioned method is shown in FIG. 5. It comprises a flat wire 21 of substantially rectangular cross section wrapped helically with successive turns adjoining one another side-by-side to form an outer self-supporting sheath about an inner tubular plastic liner 22. The liner has a bore 23 of nominally uniform circular lateral cross section which has been deformed inwardly by the sheath wire 21 in helical zone 24 throughout the length of the liner 22 corresponding to the helix of the sheath wire 21. The inwardly deformed helical zone 24 is created in situ during fabrication by the indenting effect of one corner edge of the sheath wire 21 as described above. In FIG. 6, the cross section of the sheath wire 21 is shown to be slightly concave exteriorly, which is a natural effect of helically bending what originally was a truly flat wire.

FIG. 5 is illustrative of a complete section of the new push-pull cable assembly and therefore it includes a slidable core element 25 of circular lateral cross section which may be a stranded or unitary elongated element. It is to be noted that while the core element 25 is in slidable engagement with the casing, it cannot contact the bore of the liner 22 throughout its entire length in complete surface-to-surface engagement. Rather, the core element 25 is in interrupted bearing contact solely with the helical lands 24 and defines voids 26 with the remainder of the bore of the liner 22. When the core element 25 is coated with a lubricant during operation, the lubricant collects in the voids 26 and provides the requisite anti-friction film for the isolated zone 24 where the core element 25 does engage the liner 22.

One particular sample of a lubricated push-pull cable assembly similar to that shown in FIG. 6 was displaced through a three-inch stroke at fifteen strokes per minute for a total of two thousand cycles against a dead weight load at the output end of 105 lbs. After that rigorous effort, a foce at the operator's end of only 128 lbs. was required to overcome static friction. To the best of my knowledge, conventional nylon-lined wire-sheathed push-pull cables are utterly incapable of an operating efficiency even approaching that level.

The patterns of purposeful deformation which can be formed in the plastic liner of the new assembly are by no means limited to that shown in FIG. 5. I have discovered that the physical properties and dimensions of the flat wire used to form a sheath may be varied to produce a wide range of patterns of the liner deformation. The same is true of such other variables as the rate of advance of the flat wire effected by the feed rolls, the angular disposition of the forming rolls with respect to the tubing axis and their rate of rotation, the forming roll profiles, and so on. Some examples of these variations are shown for purposes of illustration in FIGS. 6 through 8.

Figure 7:
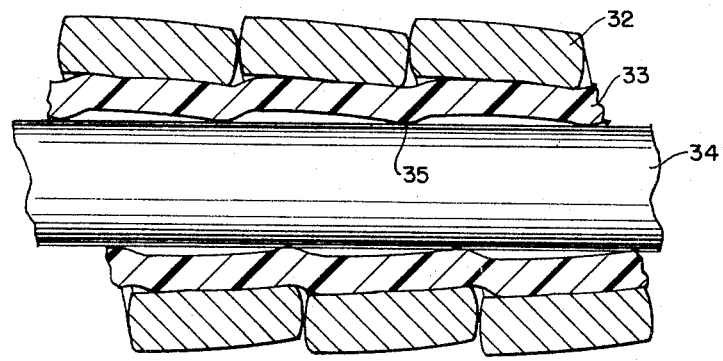
Figure 8:
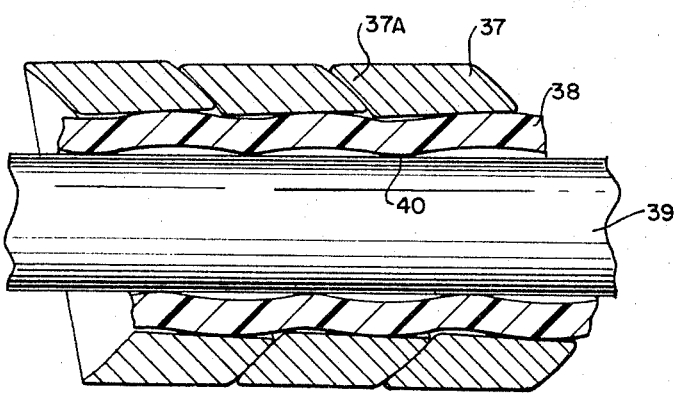

In FIG. 6, the casing is again made up of a flat wire 27 helically wrapped with adjoining turns into a sheath about a tubular plastic liner 28, with a slidable core element contained therewithin. In this embodiment, the previously mentioned tendency of a flat wire to form an exteriorly concaved cross section during the helical wrapping steps is utilized so that the central region of the wire 27 forms a helical land 30 on the bore of the liner 28 to provide the desired interrupted bearing surface. This FIG. 5 embodiment may be formed by the apparatus described with reference to FIGS. 1–4, but the corner edge of the wire 27 is not indented into the liner 28 by a groove in the lower forming roll such as the groove 17. In FIG. 7, a sheath wire 32 is wrapped about a liner 33 to form a casing into which a core element 34 is fitted, but in this embodiment the wire 32 is allowed to retain its skewed orientation imparted by the groove 17 in the lower forming roll 14 and is not brought back into parallel relation with the liner axis by the nose of the pad 20. Again, however, helical lands 35 are formed on the liner bore to engage the core element 34 in interrupted bearing contact. In FIG. 8, a sheath wire 37 is provided which has a cross section in the shape of a parallelogram so that one turn of the sheath wire partially overlies the next in the manner shown. The sheath wire 37 is applied about a liner 38 to form a casing into which a slidable core element 39 is fitted, and a helical land 40 is impressed in the bore of the liner to provide the interupted bearing surface. When the sheath wire 37 is wrapped in accordance with the FIGS. 1–4 method, the leading ledge 37A of the sheath wire 37 undergoes a certain thickening with respect to its opposite trailing edge.

The embodiments shown in FIGS. 5–8 are simply illustrative of the many forms of the product of the invention which can be made when a sheath wire is helically wrapped about a plastic liner so as to deform the bore of the liner radially inwardly. Those figures are somewhat schematic inasmuch as they show the purposeful deformation of the plastic liner in a rather exaggerated form. Actually, the helical lands formed on the bore of the liner may project only a few thousandths of an inch radially inwardly, but that is all that is necessary to relieve the slidable core element of complete surface-to-surface bearing contact with the liner and to provide voids in which the lubricant can be contained. Also, it is helpful in practice to provide a certain clearance between the core element and casing liner to aid in the assembly of the unit, though for purposes of illustration FIGS. 5–8 show the helical lands on the liner in uniformly close contact with the core element. Consequently, the core element may not contact all of the lands due to the clearance between it and the liner.

It is also to be understood that the term "push-pull" cable as used herein is not to exclude cable assemblies in which the core element is subjected only to tension or only to compression during use.

I claim:
1. A method of making a push-pull cable casing which comprises the continuous steps of:
 (a) axially translating and rotating an indefinite length of plastic tubing having a nominally uniform annular cross section,
 (b) axially translating an indefinite length of flat wire toward said tubing substantially perpendicularly with respect to the tubing axis and with the plane of the flat wire skewed at an acute angle with respect to the tubing axis, and
 (c) helically wrapping the flat wire in a succession of adjoining turns compressively about said tubing so as to deform the tubing bore inwardly in a helical zone throughout its length corresponding to the helix of the wrapped wire, by the steps of:
  i. wrapping the advancing skewed wire tightly around substantially a quarter of the tubing circumference to indent the tubing with a corner edge of the wire and form an inwardly extending land on the tubing bore.
  ii. thereafter turning the plane of the flat wire substantially parallel to the tubing axis, and
  iii. thereafter continuously helically wrapping the flat wire about the remainder of the tubing circumference so as to compress the tubing radially inwardly.

2. The method according to claim 1 wherein said acute angle is less than seven degrees.

3. A method of making a push-pull cable which comprises:
 (a) axially translating and rotating a length of plastic tubing with respect to a length of wire,
 (b) axially translating the length of wire toward said tubing substantially perpendicularly with respect to the tubing axis,
 (c) helically wrapping said wire in a succession of adjoining turns about said tubing sufficiently tightly to deform the bore of said tubing inwardly along a helical path throughout the length of the tubing,
 (d) and inserting into said tubing a core member of circular cross-section which is easily movable therein relatively thereto and which has an outside diameter substantially equal to the minimum inside diameter of the helically deformed portion of the plastic tubing, whereby said core member makes contact with the plastic tubing only where such tubing has been deformed inwardly and elsewhere is spaced therefrom.

4. A method according to claim 3, involving wrapping a flat wire about the plastic tubing,
 (a) plastically deforming said flat wire as it is wrapped in place in contact with said tubing,
 (b) and deforming the tubing in a helical path by the act of plastically deforming the flat wire in contact therewith.

5. A method according to claim 3, involving introducing a lubricant into the interior of the plastic tubing where the core element is spaced therefrom.

References Cited
UNITED STATES PATENTS

| | | | |
|---|---|---|---|
| 325,591 | 9/1885 | Coultaus | 138—134 |
| 746,630 | 12/1903 | Greenfield | 138—134 X |
| 2,266,227 | 12/1941 | Mall | 138—134 |
| 3,015,969 | 1/1962 | Bratz | 74—501 |

CHARLIE T. MOON, *Primary Examiner.*